United States Patent [19]
Donges

[11] Patent Number: 5,226,789
[45] Date of Patent: Jul. 13, 1993

[54] COMPOSITE FAN STATOR ASSEMBLY

[75] Inventor: George L. Donges, Fairfield, Ohio

[73] Assignee: General Electric Company, Cincinnati, Ohio

[21] Appl. No.: 698,862

[22] Filed: May 13, 1991

[51] Int. Cl.$^5$ .............................................. F01D 9/04
[52] U.S. Cl. ................................ 415/189; 415/173.4; 415/191; 415/197; 415/200; 415/209.2; 415/209.3
[58] Field of Search .............. 415/170.1, 173.1, 173.3, 415/173.4, 174.2, 174.4, 189, 191, 196, 197, 209.1, 209.2, 209.3, 209.4, 200, 9; 416/144

[56] References Cited
U.S. PATENT DOCUMENTS

| | | |
|---|---|---|
| 2,722,373 | 11/1955 | Ledwith . |
| 2,945,290 | 7/1960 | Walsh .................... 415/196 |
| 4,063,847 | 12/1977 | Simmons . |
| 4,098,559 | 7/1978 | Price . |
| 4,132,069 | 1/1979 | Adamson et al. ................. 415/200 |
| 4,655,682 | 4/1987 | Kunz et al. . |
| 4,786,347 | 11/1988 | Angus . |
| 4,803,893 | 2/1989 | Bachinski ..................... 416/144 |
| 4,840,536 | 6/1989 | Sikorski . |
| 4,848,182 | 7/1989 | Novotny ....................... 416/144 |
| 4,934,899 | 6/1990 | Patacca ......................... 415/9 |
| 5,083,900 | 1/1992 | Carletti et al. .................. 415/209.3 |

FOREIGN PATENT DOCUMENTS

| | | |
|---|---|---|
| 0030179 | 6/1981 | European Pat. Off. . |
| 0277884 | 7/1990 | European Pat. Off. . |
| 0227457 | 3/1925 | United Kingdom .............. 415/209.4 |
| 2201732 | 9/1988 | United Kingdom ................ 415/189 |

OTHER PUBLICATIONS

"Processing of PMR-15 Prepregs for High Temperature Composites", by Mel Kaniz, article in Jan. 1990 issue of Plastics Engineering.

Primary Examiner—Edward K. Look
Assistant Examiner—Christopher Verdier
Attorney, Agent, or Firm—Jerome C. Squillaro; Carmen Santa Maria

[57] ABSTRACT

A composite multi-stage fan stator assembly including a continuous ring composite fan case assembly supports at least one composite fan stator assembly for disposal between two respective fan rotor stages. The fan case assembly includes a forward fan case assembly and an aft fan case assembly use to mount and secure a fan stator stage axially disposed between them using hook and slot attachment means. A rotor access means comprising at least one removable vane segment in the fan stator stage and a corresponding access port through the composite fan case assembly for removing the removable vane segment is also provided.

14 Claims, 4 Drawing Sheets

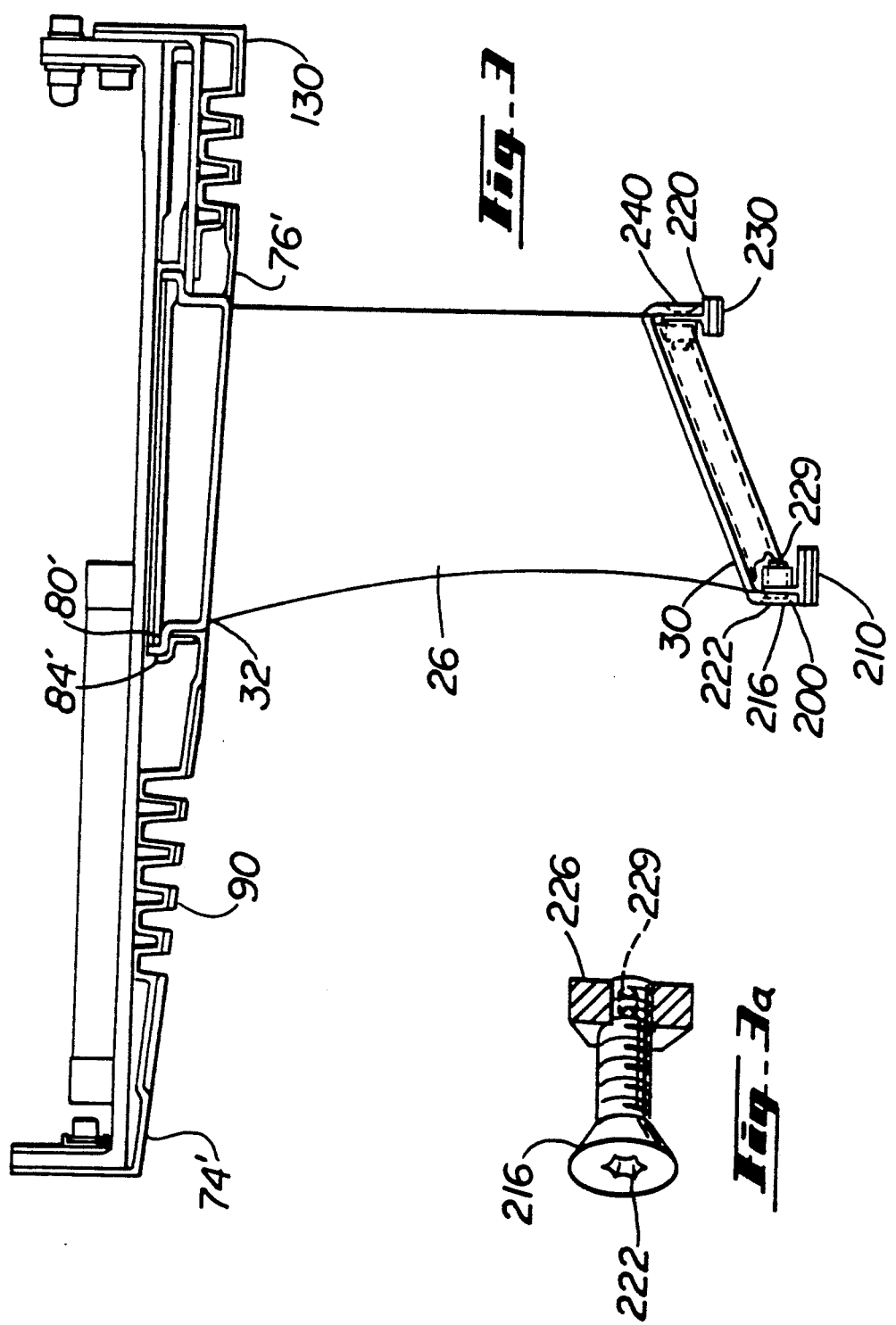

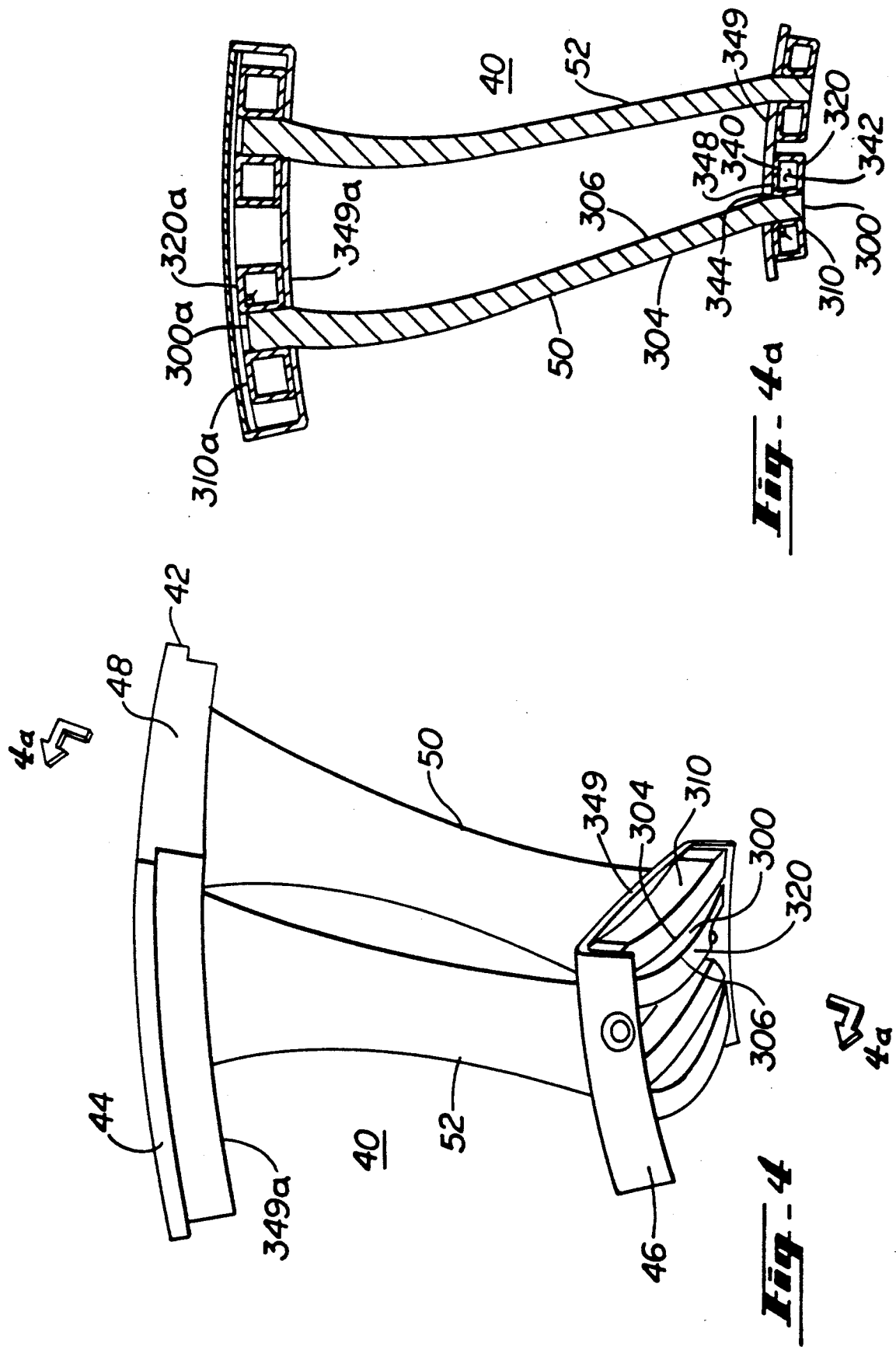

COMPOSITE FAN STATOR ASSEMBLY

The Government has rights in this invention pursuant to Contract No. F33657-83-C-0281 awarded by the United States Department of the Air Force.

BACKGROUND OF THE INVENTION

1. Field of the Invention

This invention relates to gas turbine engine fan sections, and particularly to fan cases and assemblies.

2. Description of Related Art

Gas turbine engines having multiple fan stage rotors are conventionally circumscribed by metal fan cases supporting at least one array of fan stators between the fan rotor stages. Metal fan cases are often made of titanium or steel alloys and provide fan blade containment in case a fan blade, or a part of a blade, breaks and is thrown radially outward into the case. Typically, multistage fan engines employ horizontally split fan cases around the rotor for ease of assembly, disassembly, reassembly, overhaul, repair, access to the rotor and balancing of the rotor, just to name a few advantages.

Horizontally split cases require yet thicker metal casings than are otherwise required in order to provide blade containment capabilities. This further adds to the weight of the casing which is very undesirable, particularly for high performance military type turbofan engines. Single fan stage engines of the type used primarily for commercial applications conventionally employ Kevlar-wrapped non-split or continuous ring cases. Continuous Kevlar wraps around fan cases is a well-known means of containing blade and blade fragments and preventing further engine or aircraft damage.

One can readily see the difficulty of trying to employ continuous rings to surround a multistage fan rotor. Conventionally, such assemblies employ circumferential flanges at the beginning and end of each ring case which are then bolted together, instead of employing a single ring case. Conventional multistage fan cases do not use Kevlar wraps, are made of metal, and have a heavy continuous ring and/or horizontally split cases. Kevlar is not used for split cases because of the discontinuity at the split line and its corresponding horizontal flange.

Another problem posed by composite material advances is how to form and mount lightweight composite vanes in a manner that will efficiently redistribute the loads from the vanes into the cases, while preventing delamination or other damage of composite vanes and cases. This problem is compounded by the complexity of high performance vane shapes, and in particular, the great degree of twist and curvature of the vanes.

SUMMARY OF THE INVENTION

The present invention provides a composite, multistage fan stator assembly including a continuous ring composite fan case assembly supporting at least one composite fan stator vane assembly for disposal between two respective fan rotor stages. The fan stator assembly includes a forward fan case assembly, an aft fan case assembly and a vane sub-assembly. The vane sub-assembly is supported and positioned axially, radially and circumferentially by the forward and aft case assemblies.

The fan stator vane sub-assembly includes a circumferential array of stator vanes radially disposed between inner and outer shrouds. The fan stator vane assembly(s) may be segmented into sectors or segments consisting of two or more vanes or may be a 360 degrees assembly. In either embodiment, the composite multistage fan stator assembly includes a rotor access means comprising at least one removable vane segment in the fan stator stage and a corresponding access port through the composite fan case assembly for removing the removable vane segment.

The present invention includes Kevlar wraps around forward and aft fan case sub-assemblies for blade out protection and stall groove rings. One embodiment provides stall groove rings made out of a composite material, while another utilizes silicone rubber for that purpose.

The present invention provides a composite vane attachment means for mounting composite vanes to inner and outer shrouds. Angled attachment elements, preferably having a 90 degree box-like cross-section, are adhesively mounted in a conformal manner to the pressure and suction sides of composite vane roots and to respective inner and outer shrouds. A vane is a specific type of airfoil and the attachment means of the present invention is also useful for other composite airfoil attachment means.

The composite elements of the present invention employ the term composite, for the purposes of this invention, to denote a material containing a fiber such as a carbonaceous, silica, metal, metal oxide, or ceramic fiber embedded in a resin material such as Epoxy, PMR-15, BMI, PEEU, etc. Of particular use are fibers woven into cloth that is impregnated with a resin and cured via an autoclaving process or press molding to form a hard, relatively homogeneous article. The composite suggested in the preferred embodiment is a graphite woven cloth impregnated with a PMR-15 polyimide resin. This includes tape as well as fabric.

ADVANTAGES

Among the advantages provided by the present invention is the ability to construct a multi-stage fan stator assembly that is durable, lightweight, and allows construction of parts having complicated shapes. The present invention also provides a means to use lightweight wrapped blade containment means such as Kevlar. The present invention also allows for the use of a lightweight fan stator assembly in conjunction with a multistage gas turbine engine fan module that is easily assembled, disassembled, reassembled, and which provides ease of access for repair and overhaul procedures such as rotor balancing. Another advantage provided by the present invention is a lightweight, durable, and reliable means to attach composite vanes, particularly ones having highly curved airfoil cross-sections, to inner and outer shrouds, particularly composite shrouds.

BRIEF DESCRIPTION OF THE DRAWING

The foregoing aspects and other features of the invention are explained in the following description, taken in connection with the accompanying drawing where:

FIG. 3 is a cross sectional view of the original embodiment which was similar to the fan stator assembly in FIG. 1.

FIG. 3a is a partial perspective view of a special Torx head screw means of the present invention shown in FIG. 3.

FIG. 4 is a perspective view, aft looking forward, of a two vane segment of the fan stator assembly in FIG. 3.

FIG. 4a is a cross-sectional view, forward looking aft, of the two vane segment of the fan stator assembly in FIG. 4.

DETAILED DESCRIPTION OF THE INVENTION

The present invention is a composite fan stator assembly wherein many, but not necessarily all, of the elements are made of composite parts. Over the years, the term composite has had several meanings regarding the use of two or more materials having different properties. More recently, in the aerospace industry, the term composite has come to be defined as a material containing a reinforcement such as fibers or particles supported in a binder or matrix material. Many composites are adequate for the present invention, however the preferred embodiment is preferably made of a woven carbon fiber cloth and PMR-15 resin matrix. A discussion of this material may be found in an article in the January 1990 issue of Plastics Engineering, entitled "Processing of PMR-15 Prepregs for High Temperature Composites", by Mel Kaniz, which is incorporated herein by reference. Further information concerning suitable materials and definitions may be found in the "Engineering Materials Handbook" by ASM INTERNATIONAL, 1987-1989 or later editions, which is incorporated herein by reference.

Figure 1:
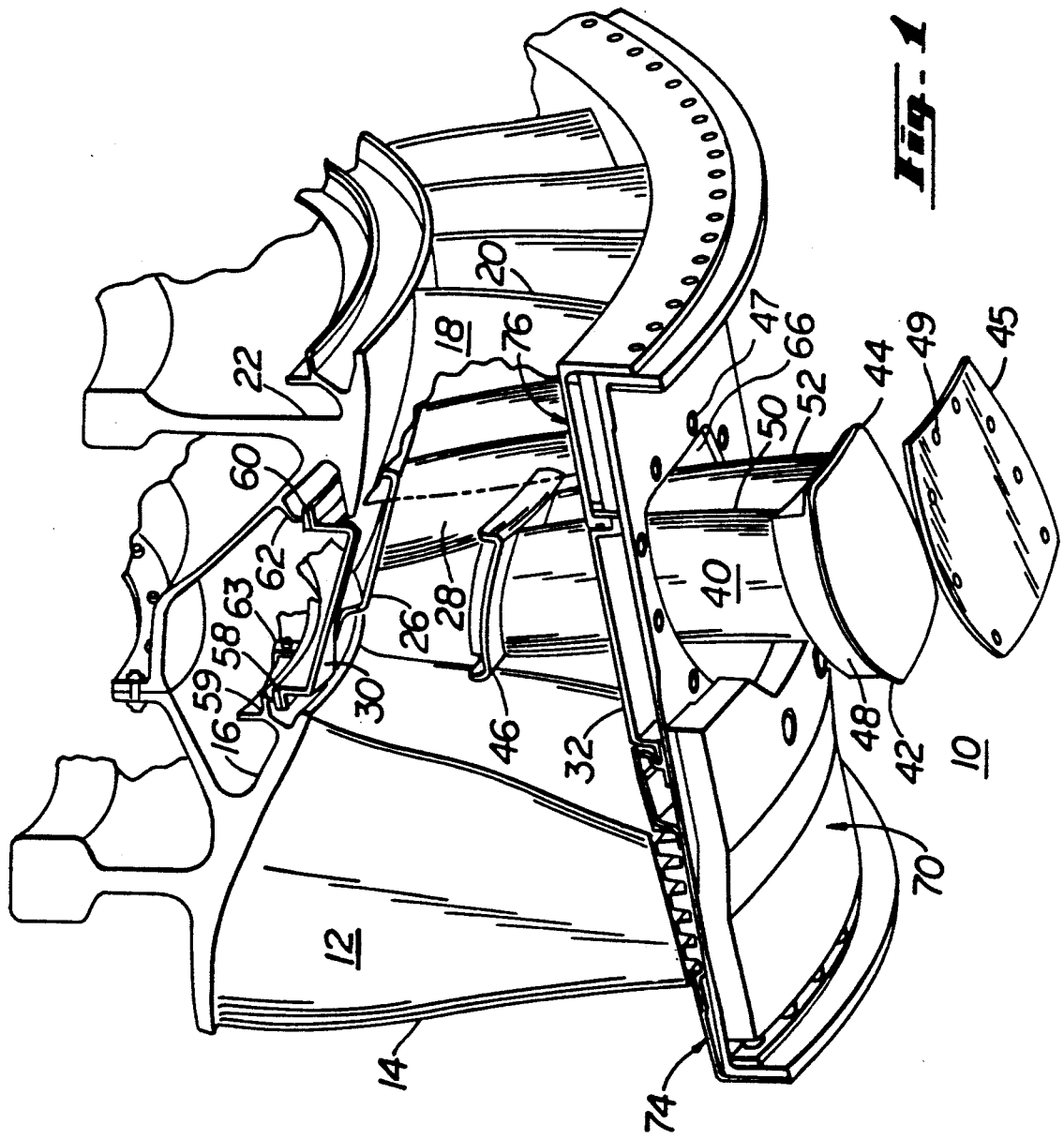
FIG. 1 is a partial cutaway perspective view, aft looking forward, of a gas turbine engine two stage fan section including a fan stator assembly in accordance with one embodiment of the present invention.

The present invention is directed to a multi-stage fan stator assembly for use in the fan section or fan module of a gas turbine engine. The invention is illustrated herein by a two stage fan section but is not limited to such. Illustrated in FIG. 1 is a portion of a fan assembly 10 that can serve as a fan module of a gas turbine engine having a fan rotor 11 including first and second fan rotor stages 12 and 18 having first and second stage fan disks 16 and 22 respectively. First stage fan blades 14 and second stage fan blades 20 are mounted on respective first and second disks 16 and 22 respectively. Fan rotor 11 is illustrated as a bolted disk type having integral blades and disks that are commonly referred to as BLISKS. The present invention contemplates the use of other types of rotors.

Axially disposed between first and second fan rotor stages 12 and 18 is a fan stator stage 26. Stator stage 26 includes a circumferential array of composite stator vanes 28 disposed between inner stator shroud 30 and outer stator shroud 32. The composite vanes are preferably constructed of the preferred carbon cloth and PMR-15 material in tape form and coated with an EYMYD and/or Ni-Ti-B2 coating for improved corrosion resistance. Stator stage 26 is illustrated in FIG. 1 as a continuous ring, however it may be a segmented assembly as shown and described herein and illustrated in FIG. 3.

Referring to FIG. 1, a composite fan stator assembly 70 surrounds first and second fan rotor stage 12 and 18 respectively to form the radial outer boundaries of the fan flowpath 71 and to provide containment in case of failure of fan blades 12 and 20. Fan stator assembly 70 also serves to support stator stage 26.

A removable, preferably two vane segment 40, of stator stage 26, either continuous or segmented, is provided to gain access to fan rotor 11 for the purposes of overhaul, repair, and other procedures such as balancing rotor 11. Removable vane segment 40 includes two vanes 50 and 52 disposed between an inner platform 46 and an outer platform 48. Inner platform 46 is designed to integrate smoothly with inner shroud 30 and outer platform 48 is designed to integrate smoothly with outer shroud 32. Removable vane segment 40 is illustrated in FIG. 1 in a partially removed position to show assembly, disassembly, and removal of removable vane segment 40. With removable vane segment 40 removed various balancing weights 63 may be installed and removed through an access port 66 in composite fan stator assembly 70 as fan rotor 11 is rotated.

Outer platform 48 includes forward and aft overhangs 42 and 44 respectively for engaging outer shroud 32. A cover plate 45 that is made of metal and is thick enough to provide containment, includes bolt holes 49 for using bolts to secure plate 45 to composite fan case 70 using threaded bolt holes 47. This traps overhangs 42 and 44 between cover plate 45 and outer shroud 32, thereby securing removable vane segment 40 in place.

Figure 2:
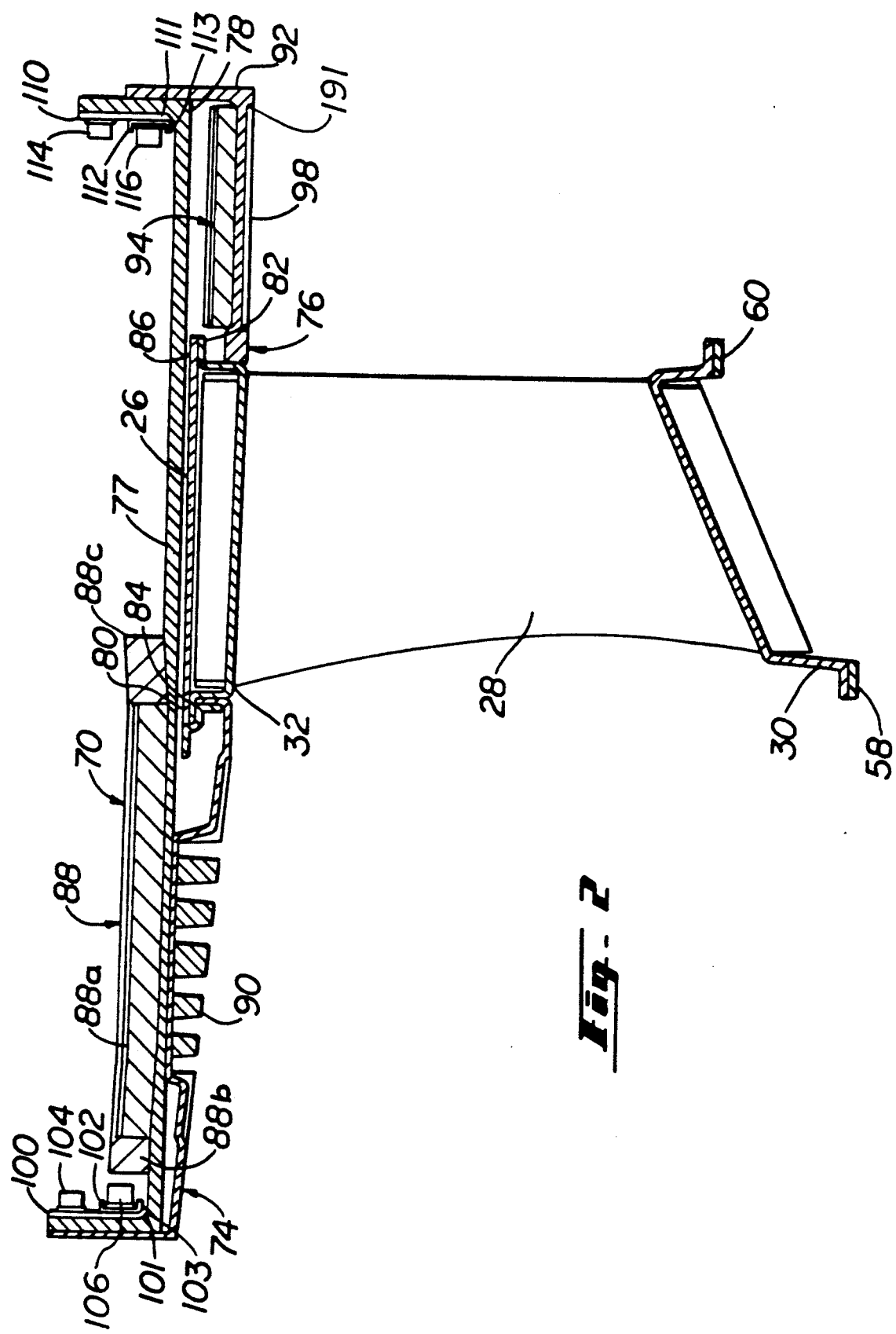
FIG. 2 is a cross sectional view of the fan stator assembly in FIG. 1.

FIG. 2 is a cross-section illustration of fan stator assembly 70 and stator stage 26. Forward fan case 74 includes a composite forward fan case core 77, preferably a composite material made from woven carbon fiber cloth and PMR-15 matrix resin. Aft fan case 76 includes a composite aft case core 91, preferably a composite material made from woven carbon fiber cloth and PMR-15 matrix resin. A discussion of suitable materials may be found in an article in the January 1990 issues of Plastics Engineering, entitled "Processing of PMR-15 Prepregs for High Temperature Composites", by Mel Kaniz, which is incorporated herein by reference.

Surrounding first fan rotor stage 12 (not shown in FIG. 2) is a Kevlar containment ring 88 disposed on the outside of a forward portion of forward fan case section 74 surrounding and effective to contain a failed first stage fan blade 14 (not shown in FIG. 2, see FIG. 1). Kevlar is a material well known as being useful for containment of rotor blades which may become fragmented or broken off of and centrifuged outward as debris from rotor 11.

Kevlar containment ring 88 is preferably a wrapped material, as is well known in the art, having two outer plies 88a and forward and aft extremities 88b and 88c respectively impregnated with a resin to provide a barrier to dust and moisture.

An aft composite fan case 76 is disposed radially inward and snugly against forward case 74. Forward case 74 and aft case 76 trap and support stator stage 26 by its outer shroud 32 using a forward axially extending hook 80 on outer shroud 32, which is received in a forward slot 84 of forward fan case section 74. A similar hook and slot attachment means is used for the aft end of outer shroud 32 wherein an aft hook 82 on outer shroud 32 is received in an aft slot 86 of aft fan case section 76.

Aft case 76 includes an aft Kevlar ring 94, preferably made in the same manner as Kevlar ring 88 to withstand dust and moisture, around its outer periphery for blade containment purposes. An abradable rub strip 98 preferably made of Metco 601 is disposed in a relatively shallow channel 191 of aft fan case section 76 radially outward of second stage fan blades 20 (not shown in FIG. 2).

Forward fan case core 77 has an L shaped forward flange 75 and L shaped aft flange 78. Aft fan case core 91 has an L shaped aft attachment flange 92 which is bolted to aft flange 78 of forward fan case core 77. This provides a means of securing and tightening composite fan stator assembly 70 while being able to control the pressure forces acting on the various composite components.

A frame attachment means for attaching flanges 75, 78, and 92 of fan stator assembly 70 to corresponding flanges of forward and aft gas turbine engine frame members (not shown) is shown as forward and aft annular rows of bolt attachment means 106 and 116 respectively.

Annular forward and aft flange stiffening plates 100 and 110, respectively, are preferably segmented and used to help evenly distribute the pressure forces induced by bolt tightening. These plates also help prevent delamination of the composite layers. Stiffening plates 100 have rounded inner ends 101 and 111 that fit snugly into the fillet radii 103 and 113 of the forward and aft flanges 75 and 78 respectively. This makes it possible to carry the high axial design loads through the flanges because without them the flanges would delaminate in the fillet area at relatively small loadings. The stiffening plates are segmented to compensate for differential thermal growth.

A forward nut locking channel 102 is segmented and provided to secure and prevent turning of the corresponding row of bolts or nuts of the bolt attachment means because of the difficulty of reaching the bolts and nuts with a wrench.

Forward case 74 includes, in the preferred embodiment, a forward or first fan stage stall groove ring 90 which, is for the purposes of cost, is a continuous ring made of a rubber-like material such as Dow Corning 93-118. In an alternate embodiment, such as that shown in FIG. 3, forward or first fan stage stall groove section 90 may be segmented and made of the same composite carbon cloth and PMR-15 material as the composite forward fan case core 77.

The present invention, as illustrated in FIGS. 1 and 2, depicts a stator stage 26 having continuous ring inner and outer shrouds 30 and 32 respectively with a removable vane segment 40. The vanes of stator stage 26 such as vanes 50 and 52 as well as inner and outer shrouds 30 and 32 are preferably made of the same preferred composite material. Inner shroud 30 has forward and aft seal lands 58 and 60 respectively coated with an abradable seal land material such as Dow Corning 93-118. Forward and aft seal lands 58 and 60 interface with first rotor stage aft knife edge seal 59 and second rotor stage forward knife edge seal 62 respectively to help prevent inner flow path recirculation.

FIG. 3 depicts an alternative embodiment of the present invention that has three basic elements that are different than those of the embodiment in FIG. 1. First, there is a second fan stage stall groove ring 130 including a rub strip 98b at the fan second stage rotor blade 20 location of FIG. 1. Second, both first and second fan stage stall rings are made of the preferred composite material, a woven carbon cloth and PMR-15 resin, and are segmented. The forward composite stall groove 90 includes a rub strip 98a which is made of the same material as 98b, Metco-601. Splice keys, not shown, extending in the circumferential direction are used to connect stall groove segments butted together, thus providing hoop continuity.

Third, stator stage 26 is segmented, preferably into two vane segments, and held together in an annular array by 360 degree forward and aft inner support rings 200 and 220 respectively using special Torx head screws 216. Referring briefly to FIG. 3a., flat head Torx screws 216 includes a Torx flat head 222 and an allen wrench torquing means 229 on the threaded end of the Torx head screw which engages a corresponding nut plate 226.

Referring again to FIG. 3a, outer shroud 32 is segmented and held in place by a hook and slot attachment means similar to that of the embodiment in FIG. 1. Hook 80' and slot 84' provide slot and hook attachment means to position and support segmented stator stage 26 between forward and aft fan cases 74' and 76'.

FIGS. 4 and 4a illustrate the preferred embodiment of a vane to shroud mounting means. Illustrated in FIG. 4 is a two vane removable section 40 of FIGS. 1-3 having vanes 52 and 50 mounted between inner and outer platforms 46 and 48 respectively. Vanes, exemplified by 52 and 50, are attached by rectangular cross section composite tubes 310 and 320 to pressure and suction sides 304 and 306 respectively of blade root 300 of exemplary vane 50 by adhesively bonding. Composite tubes 310 and 320 are also bonded to their respective shrouds or platforms generically illustrated as inner and outer bases 349 and 349a, respectively. The same attachment means are used for the outer platform or shroud as well. Note the axially extending curve of the boxes corresponding to the curve of the suction and pressure sides of the vane. The box-like tubes are preferably made by heat curing in a compression mold apparatus using a heat expandable rubber mandrel, preferably made from a silicon rubber.

FIG. 4a shows a cross section further illustrating the vane attachment means in which composite tubes having a square cross section, such as 310 and 320, are used to attach inner vane root 300 to inner shroud or platform 349 and 310a and 320a are used to attach outer vane root 300a to outer shroud or platform 349a. The tubes having a square cross section include angled vane root side 344 and shroud side 348, corresponding to the elements to which they are bonded, namely vane roots and platforms or shrouds, such as 300 and 349 respectively. Preferably, the tubes are square and the blade roots are orthogonal to the platforms or shrouds and made of the preferred composite material. The hollow tubes shown preferably as box sections as illustrated herein, are fabricated by wrapping the preferred carbon cloth material impregnated with PMR15 fabric around expandable RTV mandrels and curing them in a metal female mold. The preferred adhesive is a polyimide adhesive in either film and/or paste form.

Fan assembly 10, illustrated in FIG. 1, provides an advantageous design for a multi-stage fan module that is easily assembled and disassembled. Assembly may be made in the horizontal or vertical position, but the vertical position is preferred. Composite fan stator assembly 70 is fitted around first fan rotor stage 12 and then second fan rotor stage 18 is slid into aft fan case 76 behind stator stage 26 and attached such as by bolting to first fan rotor stage 12. A forward frame (not shown) can be attached to fan assembly 10 by way of composite fan case forward flange 75 to form a fan module.

While the preferred embodiment of our invention has been described fully in order to explain its principles, it is understood that various modifications or alterations may be made to the preferred embodiment without departing from the scope of the invention as set forth in the appended claims.

We claim:

1. A composite fan stator assembly for a gas turbine engine having at least two fan rotor stages, said composite stator assembly comprising:

an annular composite fan case assembly including an access port, the fan case assembly circumferentially disposed around first and second fan rotor stage locations, a composite fan stator stage supported by and extending radially inward of said fan case assembly and axially disposed between said two fan rotor stage locations, the fan stator stage includes at least one removable vane segment accessible for removal through said access port for assembly and reassembly, said composite fan case assembly including a separable composite forward fan case assembly and a separable composite aft fan case assembly spaced axially aft of said forward fan case assembly, the forward fan case assembly being bolted to the aft fan case assembly, wherein said composite fan stator stage is axially and radially trapped and supported by said forward and aft fan case assemblies.

2. A composite fan stator assembly as claimed in claim 1 further comprising a stator stage support means having forward and aft hooks extending axially forward and aft respectively from said stator stage, said hooks engaging respective forward and aft mounting slots at least partially formed by respective ones of said forward and aft fan case assemblies.

3. A composite fan stator vane assembly as claimed in claim 2 wherein said stator stage further includes:

a circumferential array of composite stator vanes radially disposed between radially outer and inner vane composite shrouds.

4. A composite fan stator assembly as claimed in claim 2 further wherein said stator stage is segmented.

5. A composite fan stator assembly as claimed in claim 3 further comprising:

an annular Kevlar wrap fan blade containment means mounted on said composite fan case assembly.

6. A composite fan stator assembly as claimed in claim 5 further wherein said annular Kevlar fan blade containment means comprises:

a forward annular Kevlar ring around the outside of said forward fan case assembly, an aft annular Kevlar ring around the outside of said aft fan case assembly, said Kevlar rings sections positioned to provide blade containment for corresponding ones of said first and second fan blade locations respectively.

7. A composite fan stator assembly as claimed in claim 5 further comprising a composite first fan rotor stage stall groove means mounted on the inside of said forward fan case assembly positioned to provide fan blade stall prevention at a position corresponding to said first fan blade location.

8. A composite fan stator assembly as claimed in claim 6 further comprising a composite first fan rotor stage stall groove means mounted on the inside of said forward fan case assembly positioned to provide fan blade stall prevention at a position corresponding to said first fan blade location and a second composite fan rotor stage stall groove means mounted on the inside of said aft fan case assembly positioned to provide fan blade stall prevention at a position corresponding to said second fan blade location.

9. A composite fan assembly for a gas turbine engine having at least two fan rotor stages, said composite fan assembly comprising:

an annular composite fan case assembly including an access port, the fan case assembly circumferentially disposed around a rotor, said rotor including a first and a second fan rotor stage, a composite fan stator stage supported by and extending radially inward of said fan case assembly and axially disposed between said two fan rotor stages, the fan stator stage including at least one removable vane segment accessible for removal through said access port for assembly and reassembly said fan case assembly including a separable forward fan case assembly and a separable aft fan case assembly, the forward fan case assembly being bolted to the aft fan case assembly, wherein said composite fan stator stage is axially and radially trapped and supported by said forward and aft fan case assemblies, and a removable rotor balancing means on said rotor accessible through said access port.

10. A composite airfoil root to shroud attachment means comprising:

an angled attachment element having two connected legs angled with respect to each other, a first leg of said legs extending along and bonded to a curved airfoil root side, said first leg conforms to said root side, and a second leg of said legs extending along and bonded to a composite shroud surface.

11. A composite stator vane assembly comprising:

a composite inner shroud, a composite outer shroud disposed radially outward of said inner shroud, a plurality of vanes disposed between said shrouds, said vanes including a suction side and a pressure side and radially inner and outer roots, said roots extending through platforms of corresponding ones of said inner and outer shrouds, four box-type attachment elements corresponding to curved suction and pressure sides of said inner and outer roots, said box-type attachment elements having two connected legs angled with respect to each other, a first one of said legs extending along, conforming to the curve of, and bonded to a corresponding one of said airfoil root sides, and a second one of said legs extending along and bonded to a composite shroud surface.

12. A composite stator vane assembly as claimed in claim 11 wherein said inner and outer roots are disposed through said inner and outer shrouds and said attachment elements connect said roots to corresponding radially inner and outer surfaces of said inner and outer shrouds respectively.

13. A composite stator vane assembly as claimed in claim 12 wherein said attachment elements are four sided box type attachment elements wherein said first leg and second legs comprise two of said four sides.

14. A composite stator vane assembly as claimed in claim 13 wherein said attachment elements have rectangular cross-sections including said first leg and second legs and said inner and outer roots are orthogonal to said inner and outer shroud surfaces respectively.

* * * * *